US00RE47082E

(19) United States
(12) Reissued Patent
Rosner et al.

(10) Patent Number: US RE47,082 E
(45) Date of Reissued Patent: Oct. 9, 2018

(54) MULTIPIECE DECK FOR HARD DISK DRIVE

(71) Applicant: Seagate Technology LLC, Cupertino, CA (US)

(72) Inventors: Wolfgang Rosner, Burnsville, MN (US); Timothy Edward Langlais, Minneapolis, MN (US); Hany Michael Gross, Eden Prairie, MN (US); Joseph H. Sassine, Lakeville, MN (US)

(73) Assignee: Seagate Technology LLC, Cupertino, CA (US)

(21) Appl. No.: 14/556,750

(22) Filed: Dec. 1, 2014

Related U.S. Patent Documents

Reissue of:
(64) Patent No.: 8,797,679
Issued: Aug. 5, 2014
Appl. No.: 13/784,838
Filed: Mar. 5, 2013

U.S. Applications:
(60) Provisional application No. 61/760,331, filed on Feb. 4, 2013.

(51) Int. Cl.
*G11B 5/39* (2006.01)
*G11B 25/04* (2006.01)

(52) U.S. Cl.
CPC ..... *G11B 25/043* (2013.01); *Y10T 29/49021* (2015.01)

(58) Field of Classification Search
CPC ..... G11B 25/043; Y10T 29/49021
USPC ..... 360/99.2
See application file for complete search history.

(56) References Cited

U.S. PATENT DOCUMENTS 4,939,338 A * 7/1990 Bregy ..... B23K 9/232 219/118
5,081,552 A 1/1992 Glaser et al.
5,223,996 A * 6/1993 Read et al. ..... 360/99.18
5,546,250 A * 8/1996 Diel ..... 360/99.16
5,822,152 A 10/1998 Seaver et al.
(Continued)

FOREIGN PATENT DOCUMENTS

CN 1421760 A 6/2003
CN 1591669 A 3/2005
(Continued)

OTHER PUBLICATIONS

SIPO. Chinese Office Action dated Dec. 22, 2014, for counterpart Chinese Patent Application No. 201410183965.9 (with English translation).

(Continued)

*Primary Examiner* — William Doerrler
(74) *Attorney, Agent, or Firm* — Crawford Maunu PLLC

(57) ABSTRACT

An apparatus is provided, including a base-deck floor; a base-deck frame, overlying the base-deck floor; a top cover, overlying the base-deck frame; and an affixing means operable to attach the base-deck frame to the base-deck floor, wherein the base-deck frame is operable to be fastened to both the base-deck floor and the top cover to provide a housing for a hard disk drive. A method is also provided, including assembling at least a portion of a hard disk drive assembly on a base-deck floor; affixing a base-deck frame to the base-deck floor; and securing a top cover to the base-deck frame.

23 Claims, 4 Drawing Sheets

(56) References Cited

Figure 1A:
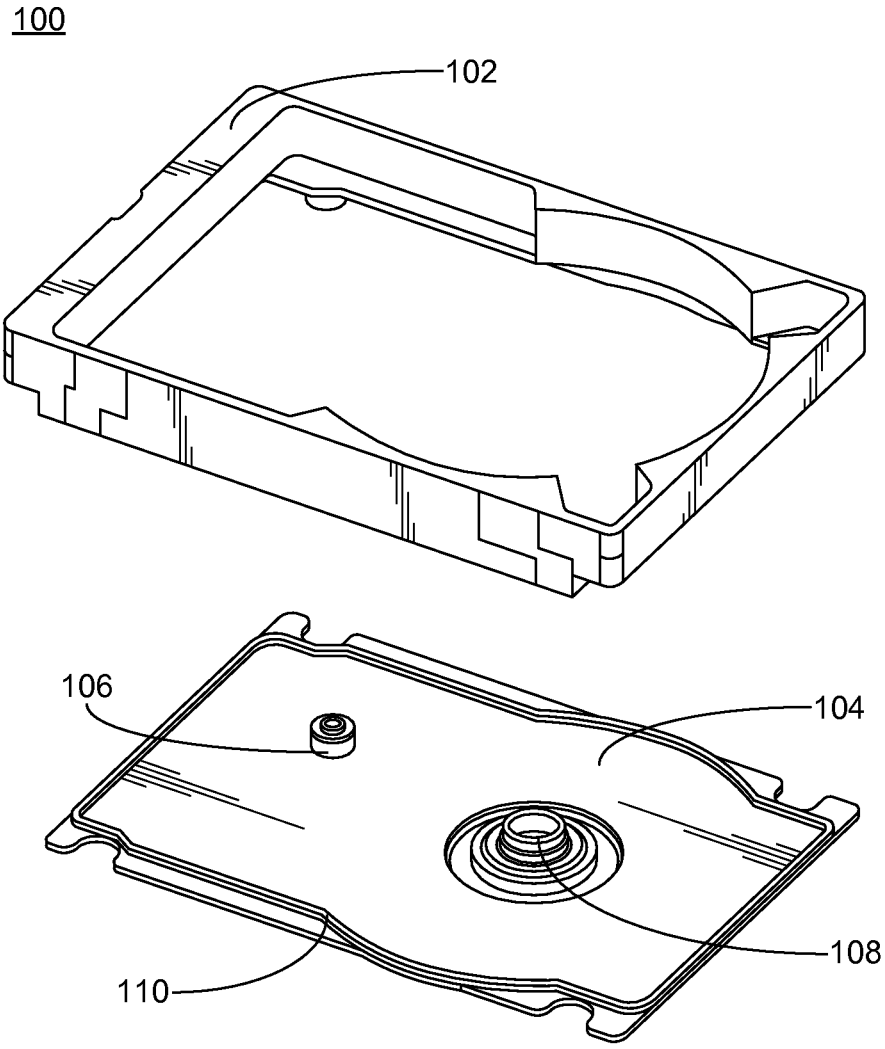

U.S. PATENT DOCUMENTS 6,005,747 A * 12/1999 Gilovich ..... 360/98.07
6,034,841 A 3/2000 Albrecht et al.
6,226,143 B1 * 5/2001 Stefanksy ..... 360/99.2
6,278,574 B1 * 8/2001 Wakita ..... G11B 17/0282 360/99.01
6,389,869 B1 * 5/2002 Wakita ..... G11B 25/043 72/379.2
6,426,847 B1 7/2002 Dague et al.
6,501,614 B1 12/2002 Kang et al.
6,646,826 B1 11/2003 Haidari et al.
6,767,238 B2 7/2004 Kitadai
6,954,328 B2 10/2005 Daniel et al.
7,146,713 B1 * 12/2006 Ying ..... G11B 25/043 29/557
7,224,550 B2 * 5/2007 Yao et al. ..... 360/99.2
7,307,811 B2 12/2007 Xu et al.
7,483,238 B2 1/2009 Xu et al.
7,484,291 B1 * 2/2009 Ostrander ..... G11B 25/043 29/603.03
7,564,645 B2 7/2009 Tsuda et al.
7,616,400 B2 * 11/2009 Byun et al. ..... 360/99.13
7,742,316 B2 6/2010 Ho et al.
7,760,464 B2 7/2010 Xu et al.
7,826,171 B2 * 11/2010 Johnston et al. ..... 360/97.12
7,921,543 B2 * 4/2011 Trongjitwikrai et al. ..... 29/603.03
7,957,092 B2 * 6/2011 Ichikawa ..... G11B 25/043 360/99.2
8,279,552 B2 10/2012 Stipe
8,553,357 B1 * 10/2013 Sorenson et al. ..... 360/99.24
2001/0002157 A1 * 5/2001 Wakita ..... G11B 17/03 360/99.18
2005/0046997 A1 * 3/2005 Kimura ..... G11B 25/043 360/99.18
2005/0068666 A1 * 3/2005 Albrecht ..... G11B 33/1466 360/99.18
2005/0235295 A1 * 10/2005 Hsu ..... G11B 33/124 720/600
2005/0286163 A1 12/2005 Kim et al.
2006/0050431 A1 * 3/2006 Byun ..... G11B 31/00 360/99.13
2008/0089020 A1 * 4/2008 Hiew ..... H05K 9/0067 361/679.31
2008/0247082 A1 * 10/2008 Kavosh ..... G11B 33/1446 360/99.21
2011/0073575 A1 * 3/2011 Catalano ..... B23K 37/00 219/121.64
2012/0275054 A1 11/2012 McGuire, Jr. et al.

FOREIGN PATENT DOCUMENTS

JP 63-025877 A 2/1988
JP H05-274857 A 10/1993
JP H11-232832 A 8/1999
JP 2001-332066 A 11/2001

OTHER PUBLICATIONS

IPOS Search Report (Danish PTO) dated Feb. 25, 2015, for related Singapore Patent Application No. 2014008007 (in English), 1 sheet attached.
Japanese Office Action dated May 16, 2017, for related Japanese Patent Application No. 2014-019488, 3 pages (English translation not available).

* cited by examiner

MULTIPIECE DECK FOR HARD DISK DRIVE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This application claims the benefit of U.S. Provisional Patent Application No. 61/760,331, titled "MULTIPIECE DECK FOR HARD DISK DRIVE", filed Feb. 4, 2013.

BACKGROUND

In efforts to increase the data-storage capacity of hard disk drives, consideration is given to loading additional data-storage disks onto hard disk drive hubs; however, space is limited, as form factors define the space in which hard disk drive assemblies must fit. As a result, designers may consider thinner and/or shorter components for hard disk drive assemblies that are able to fit into such hard disk drive form factors.

The base-deck section of hard disk drive housing under the spindle motor may become thin in accommodating the extra height associated with loading additional data-storage disks onto the hard disk drive hub. A thin base-deck section of hard disk drive housing may affect the stiffness of the base-deck, which may degrade the performance of the components attached to the base-deck through shock, vibration, and/or acoustics. As such, different hard disk drive housings including different base decks may be used in hard disk drives designs.

SUMMARY

An apparatus is provided, including a base-deck floor; a base-deck frame, overlying the base-deck floor; a top cover, overlying the base-deck frame; and an affixing means operable to attach the base-deck frame to the base-deck floor, wherein the base-deck frame is operable to be fastened to both the base-deck floor and the top cover to provide a housing for a hard disk drive. A method is also provided, including assembling at least a portion of a hard disk drive assembly on a base-deck floor; affixing a base-deck frame to the base-deck floor; and securing a top cover to the base-deck frame. These and other features, aspects, and advantages of the invention may be better understood with reference to the following drawings, description. and appended claims.

DRAWINGS

FIG. 1A provides an exploded view of a base-deck assembly from the top in accordance with at least one embodiment.

Figure 1B:
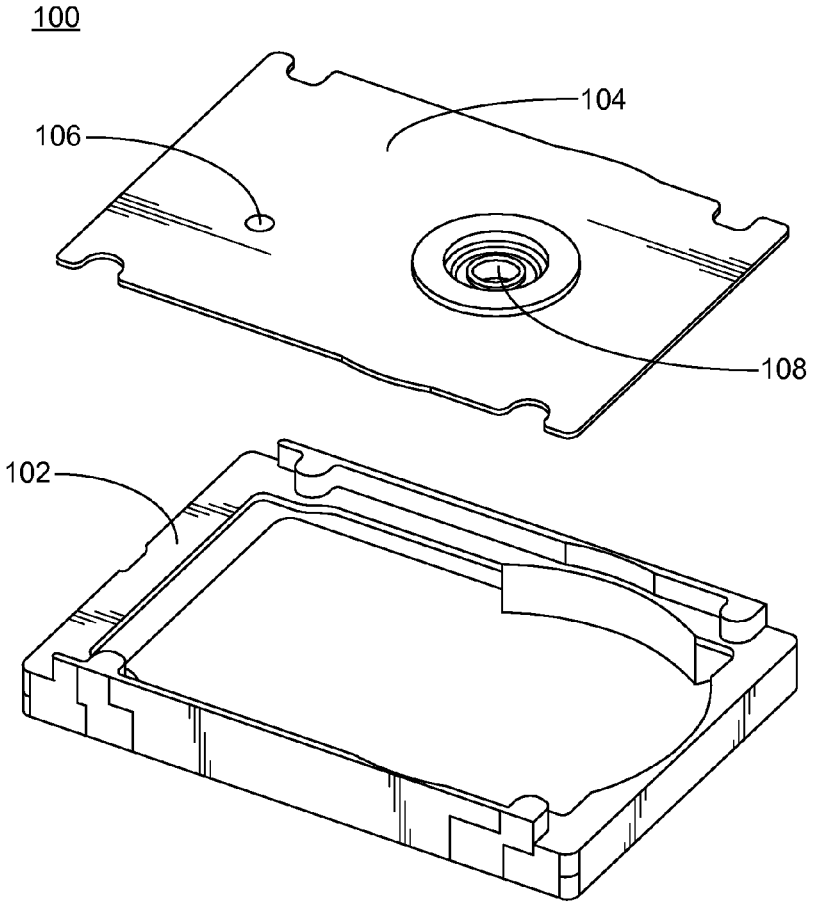

FIG. 1B provides an exploded view of a base-deck assembly from the bottom in accordance with at least one embodiment.

Figure 2:
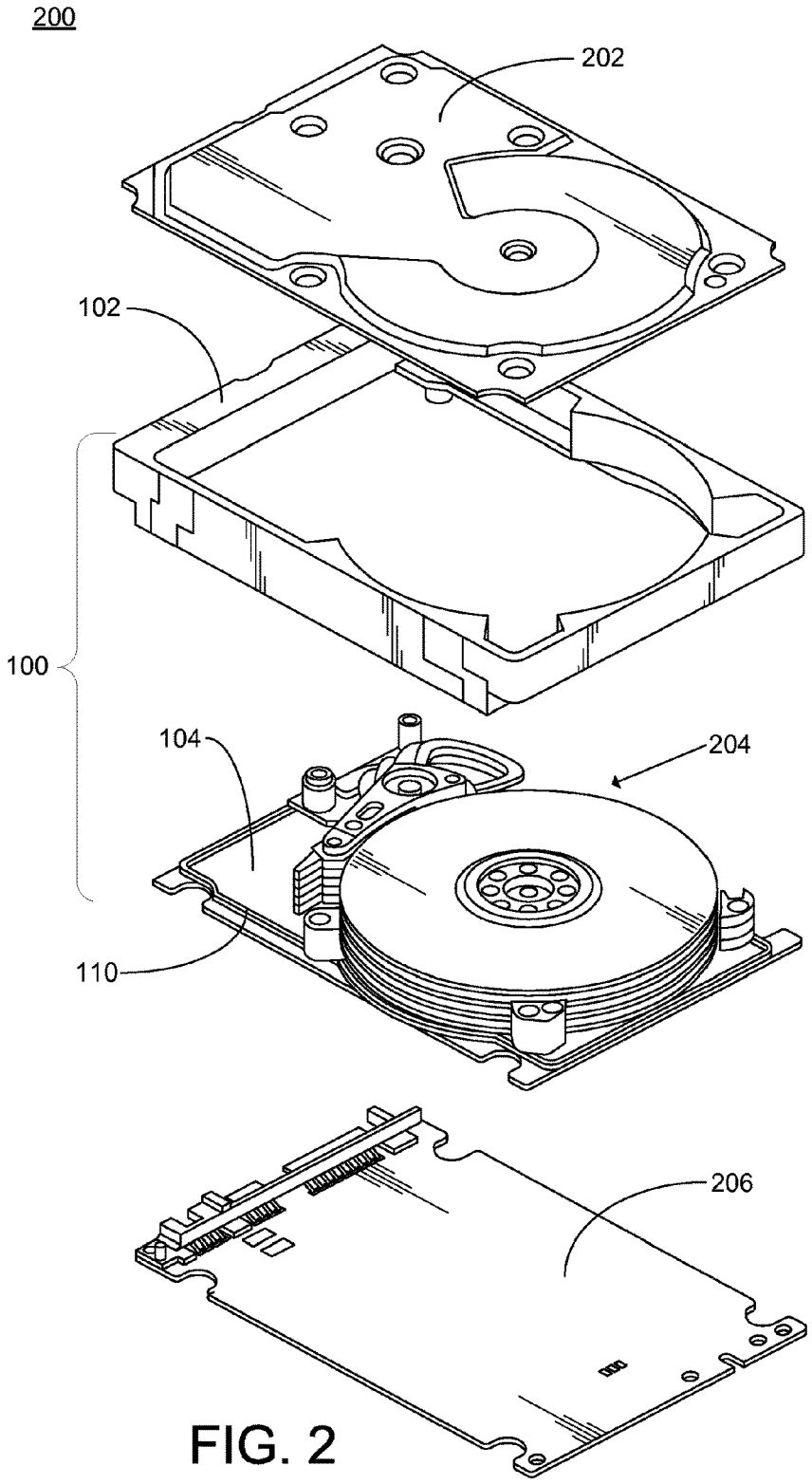

FIG. 2 provides an exploded view of housing for a hard disk drive in accordance with at least one embodiment.

Figure 3:
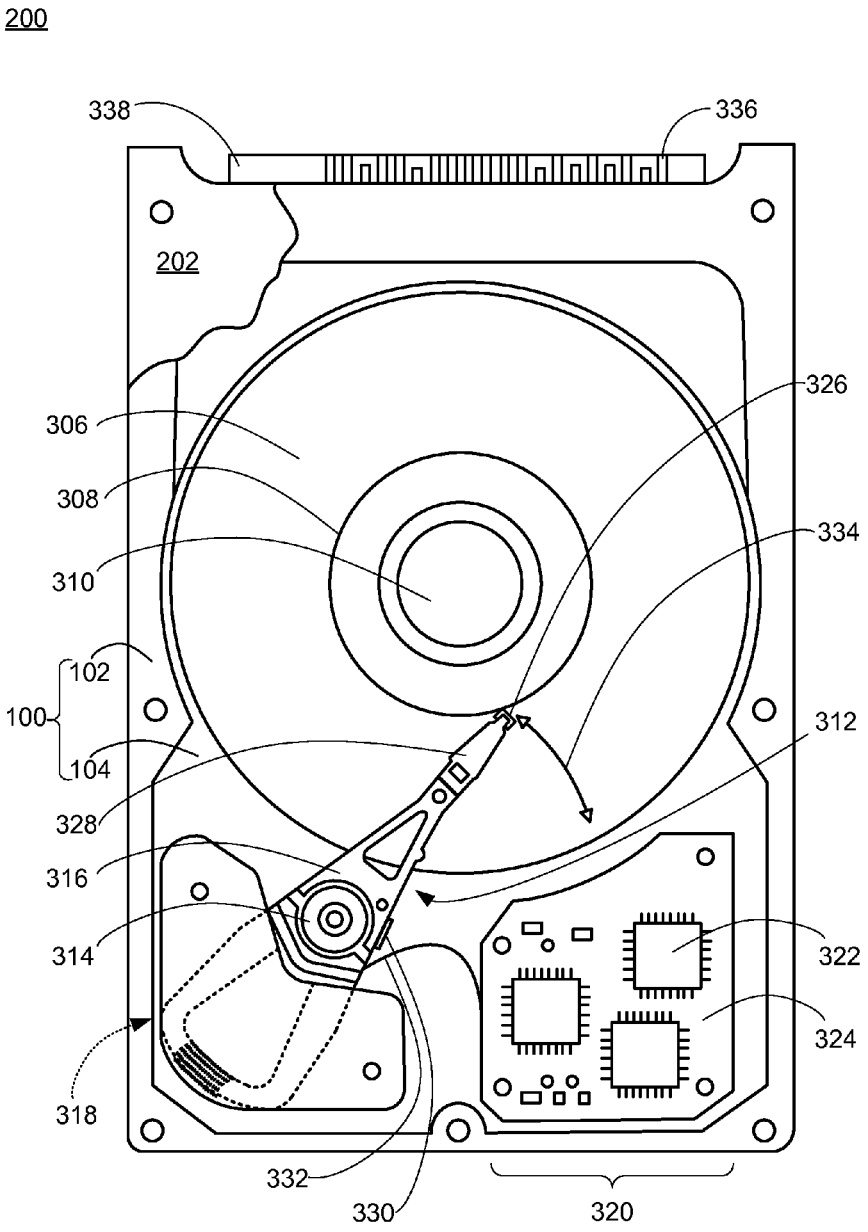

FIG. 3 provides a plan view of a hard disk drive in housing in accordance with at least one embodiment.

DESCRIPTION

Before the invention is described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing the invention and particular embodiments thereof, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

The invention will now be described in greater detail.

An apparatus is provided, including a base-deck assembly having a base-deck floor and a base-deck frame overlying the base-deck floor; a top cover overlying the base-deck assembly; and an affixing means operable to attach the base-deck frame to the base-deck floor, wherein the base-deck frame is operable to be fastened to both the base-deck floor and the top cover to provide a housing for a hard disk drive.

FIG. 1A and FIG. 1B provide exploded views of a base-deck assembly in accordance with at least one embodiment. As shown, base-deck assembly 100 comprises base-deck frame 102 and base-deck floor 104, which, in combination with a top cover, forms a housing for a hard disk drive. The housing, including each of the base-deck frame 102, base-deck floor 104, and the top cover, may adhere to any of a number of different form factors, including, for example, the 2.5" and 3.5" form factors for hard disk drives.

Base-deck frame 102 accommodates the space needed for hard disk drive internals, which hard disk drive internals may include, but are not limited to, a spindle motor, one or more data storage disks, a voice coil motor, an actuator arm assembly, and control electronics. In addition, the base-deck frame 102 may have holes in the top and/or bottom surface of the frame, designed to accommodate fasteners (e.g., screws) for fastening the top cover and/or base-deck floor to the frame. Such a base-deck frame 102 may be cast aluminum. Alternatively, base-deck frame 102 may be steel, such as stainless steel.

Base-deck floor 104 also accommodates the space needed for hard disk drive internals, which hard disk drive internals may include, but are not limited to, a spindle motor, one or more data storage disks, a voice coil motor, an actuator arm assembly, and control electronics. Base-deck floor 104 may have one or more elements for accommodating hard disk drive internals, wherein the one or more elements may include, but are not limited to, spaces, holes, and depressions. As shown in FIG. 1A, one such element may be used to accommodate a boss 106 for a pivot bearing. Another such element may be used to accommodate a boss 108 for a spindle motor. In addition, the base-deck floor 104 may have holes (e.g., peripheral holes) therethrough designed to accommodate fasteners (e.g., screws) for fastening the base-deck floor to the base-deck frame.

Such a base-deck floor 104 may be cast aluminum; however, because thinly cast aluminum may have certain manufacturing limitations (e.g., porosity and/or flow concerns in aluminum casting process) and/or performance limitations (e.g., reduced stiffness under the spindle motor), base-deck floor 104 may be fashioned from a material having a higher elastic modulus than aluminum. Such a material may be magnesium or steel, such as stainless steel, for example, stamped steel or stamped stainless steel, which material, having a higher elastic modulus than aluminum, provides more stiffness per thickness for base-deck floor 104 than a similarly cast aluminum base-deck floor. In an alternative to stamped steel or stamped stainless steel, base-deck floor 104 may be forged, extruded, or die cast.

Whether stamped, forged, extruded, or die cast, the base-deck floor 104 may be further shaped, shaved, or machined to provide a finished base-deck floor. In some embodiments, for example, the base-deck floor may be, either uniformly or in certain places, at least 100 μm and no more than 2000 μm thick (i.e., between 100 and 2000 μm thick) such as at least 100 μm and no more than 1000 μm thick (i.e., between 100 and 1000 μm thick), for example, at least 100 μm and no more than 750 μm thick (i.e., between 100 and 750 μm thick) or at least 100 μm and no more than 500 μm thick (i.e., between 100 and 500 μm thick). With respect to non-uniform thickness of the base-deck floor 104, the base-deck floor 104 may be thicker in certain places (e.g., to provide greater reinforcement and/or stiffness) or thinner in certain places (e.g., to provide more height for disk drive internals). In some embodiments, for example, the base-deck floor 104 may be 500-775 μm thick under the spindle motor, providing additional height for inclusion of, for example, an additional data storage disk. If desired to provide greater stiffness, the base-deck floor 104 may be reinforced, for example, with bracing. In some embodiments, bracing may extend radially from an area at or near a point in the base-deck floor coincident with the axis of the spindle of the spindle motor.

As provided above, each of the base-deck frame 102 and the base-deck floor may have holes designed to accommodate fasteners (e.g., screws) for fastening the base-deck floor to the frame. In such an embodiment, a gasket such as gasket 110 of FIG. 1A may be used in combination with fasteners to fasten the base-deck floor 104 to the base-deck frame 102. Gasket 110 of FIG. 1A may be a form-in-place gasket or a molded gasket. Gaskets such as gasket 110 may also be used without fasteners in some embodiments. As an alternative to the foregoing gaskets, and, optionally, as an alternative to fastening with fasteners, an epoxy or a metal seal (e.g., metal C-seal) may be used to fasten the base-deck floor 104 to the base-deck frame 102. Welding may also be used to fasten the base-deck floor 104 to the base-deck frame 102 in some embodiments. For example, welding may be used to fasten the base-deck floor 104 to the base-deck frame 102, wherein one or both of the base-deck floor and the base-deck frame comprise extruded steel, such as extruded stainless steel. Any of the foregoing may comprise an isolation seal operable to mechanically isolate forces imparted to the base-deck frame 102 or base-deck floor 104 from hard disk drive internals that are attached to the base-deck floor 104 or base-deck frame 102, respectively.

FIG. 2 provides an exploded view of a hard disk drive with a housing in accordance with at least one embodiment. As shown, the housing comprises top cover 202, base-deck frame 102, and base-deck floor 104, which housing, in combination with hard disk drive internals 204 and logic board 206 (see FIG. 3 for exposed contacts 336 of drive connector 338 on the logic board) provide a hard disk drive 200. The two-piece deck design (i.e., base-deck frame 102, and base-deck floor 104) allows for assembly of hard disk drive internals 204 to occur on base-deck floor 104 without base-deck frame 102 in place. Such an arrangement allows for greater access for merge than is currently available with one-piece cast aluminum designs.

Given the foregoing, an apparatus is described comprising a base-deck floor and a base-deck frame overlying the base-deck floor, which, in combination with an affixing means operable to affix the base-deck floor and a base-deck frame, provides a base-deck assembly. Such a base-deck assembly, further in combination with a top cover and an affixing means operable to attach the base-deck assembly to the top cover, further provides a housing for a hard disk drive. Also given the foregoing, the apparatus may comprise dissimilar materials for the base-deck floor, the base-deck frame, and/or the top cover. In some embodiments, the housing comprises a base-deck floor of steel (e.g., stainless steel), a base-deck frame of cast aluminum, and a top cover of steel (e.g., stainless steel). In other embodiments, the housing comprises a base-deck floor of magnesium, a base-deck frame of cast aluminum, and a top cover of steel (e.g., stainless steel). In yet other embodiments, each component of the housing (i.e., base-deck floor, base-deck frame, and top cover) comprises steel (e.g., stainless steel).

FIG. 3 is a plan view of a hard disk drive 200, which hard disk drive may use the base-deck assembly described herein. As such, hard disk drive 200 may include a base-deck assembly 100, comprising base-deck frame 102 and base-deck floor 104, and a cover 202 that mates with base-deck assembly 100 to define a housing for various hard disk drive components. The hard disk drive 200 includes one or more data storage disks 306 of computer-readable data storage media. Typically, both of the major surfaces of each data storage disk 306 include a plurality of concentrically disposed tracks for data storage purposes. Each data storage disk 306 is mounted on a hub 308, which in turn is rotatably interconnected with the base-deck assembly 100 and/or cover 202. Multiple data storage disks 306 are typically mounted in vertically spaced and parallel relation on the hub 308. A spindle motor 310 rotates the data storage disks 306.

The hard disk drive 200 also includes an actuator arm assembly 312 that pivots about a pivot bearing 314, which in turn is rotatably supported by the base plate 104 and/or cover 202. The actuator arm assembly 312 includes one or more individual rigid actuator arms 316 that extend out from near the pivot bearing 314. Multiple actuator arms 316 are typically disposed in vertically spaced relation, with one actuator arm 316 being provided for each major data storage surface of each data storage disk 306 of the hard disk drive 200. Other types of actuator arm assembly configurations could be utilized as well, an example being an "E" block having one or more rigid actuator arm tips, or the like, that cantilever from a common structure. Movement of the actuator arm assembly 312 is provided by an actuator arm drive assembly, such as a voice coil motor 318 or the like. The voice coil motor 318 is a magnetic assembly that controls the operation of the actuator arm assembly 312 under the direction of control electronics 320. The control electronics 320 may include a plurality of integrated circuits 322 coupled to a printed circuit board 324. The control electronics 320 may be coupled to the voice coil motor assembly 318, a slider 326, or the spindle motor 310 using interconnects that can include pins, cables, or wires (not shown).

A load beam or suspension 328 is attached to the free end of each actuator arm 316 and cantilevers therefrom. Typically, the suspension 328 is biased generally toward its corresponding data storage disk 306 by a spring-like force. The slider 326 is disposed at or near the free end of each suspension 328. What is commonly referred to as the read/write head (e.g., transducer) is appropriately mounted as a head unit (not shown) under the slider 326 and is used in hard disk drive read/write operations. The head unit under the slider 326 may utilize various types of read sensor technologies such as anisotropic magnetoresistive (AMR), giant magnetoresistive (GMR), tunneling magnetoresistive (TuMR), or tunneling giant magnetoresistive (TGMR), other magnetoresistive technologies, or other suitable technologies.

The head unit under the slider 326 is connected to a preamplifier 330, which is interconnected with the control electronics 320 of the hard disk drive 200 by a flex cable 332 that is typically mounted on the actuator arm assembly 312. Signals are exchanged between the head unit and its corresponding data storage disk 306 for hard disk drive read/write operations. In this regard, the voice coil motor 318 is utilized to pivot the actuator arm assembly 312 to simultaneously move the slider 326 along a path 334 and across the corresponding data storage disk 306 to position the head unit at the appropriate position on the data storage disk 306 for hard disk drive read/write operations.

When the hard disk drive 200 is not in operation, the actuator arm assembly 312 is pivoted to a "parked position" to dispose each slider 326 generally at or beyond a perimeter of its corresponding data storage disk 306, but in any case in vertically spaced relation to its corresponding data storage disk 306. In this regard, the hard disk drive 200 includes a ramp assembly (not shown) that is disposed beyond a perimeter of the data storage disk 306 to both move the corresponding slider 326 vertically away from its corresponding data storage disk 306 and to also exert somewhat of a retaining force on the actuator arm assembly 312.

Exposed contacts 336 of a drive connector 338 along a side end of the hard disk drive 200 may be used to provide connectivity between circuitry of the hard disk drive 200 and a next level of integration such as an interposer, a circuit board, a cable connector, or an electronic assembly. The drive connector 338 may include jumpers (not shown) or switches (not shown) that may be used to configure the hard disk drive 200 for user specific features or configurations. The jumpers or switches may be recessed and exposed from within the drive connector 338.

Thus, as provided herein, is an apparatus, comprising a base-deck floor; a base-deck frame, overlying the base-deck floor; a top cover, overlying the base-deck frame; and an affixing feature operable to affix the base-deck frame to the base-deck floor, wherein the base-deck frame is operable to be fastened to both the base-deck floor and the top cover to provide a housing for a hard disk drive. In some embodiments, the base-deck frame is operable to be unfastened from the both the base-deck floor and the top cover. In some embodiments, the base-deck frame comprises cast aluminum. In some embodiments, the base-deck floor comprises a material having a higher elastic modulus than aluminum. In some embodiments, the material and the top cover comprise stainless steel. In some embodiments, the base-deck floor comprises stamped stainless steel. In some embodiments, the base-deck floor is no more than 2000 μm thick. In some embodiments, the base-deck floor is no more than 500 μm thick. In some embodiments, the affixing feature comprises a gasket and a fastener. In some embodiments, the affixing feature comprises an epoxy or metal seal. In some embodiments, the affixing feature comprises an isolation seal operable to mechanically isolate forces imparted to the base-deck frame from internals of the hard disk drive that are attached to the base-deck frame.

Also provided herein, is a method, comprising assembling at least a portion of a hard disk drive assembly on a base-deck floor; affixing a base-deck frame to the base-deck floor; and securing a top cover to the base-deck frame. In some embodiments, the method further comprises stamping a top cover; casting a base-deck frame; and stamping a base-deck floor. In some embodiments, stamping the top cover comprises stamping the top cover from stainless steel. In some embodiments, casting the base-deck frame comprises casting the base-deck frame from aluminum. In some embodiments, stamping the base-deck floor comprises stamping the base-deck floor from stainless steel. In some embodiments, stamping the base-deck floor further comprises stamping the base-deck floor from stainless steel between 500 and 2000 μm thick. In some embodiments, affixing the base-deck frame to the base-deck floor comprises affixing the base-deck frame to the base-deck floor with a gasket and a fastener. In some embodiments, affixing the base-deck frame to the base-deck floor comprises affixing the base-deck frame to the base-deck floor with an epoxy or metal seal.

Also provided is an apparatus, comprising a top cover, optionally comprising stamped stainless steel; a base-deck assembly, the base-deck assembly comprising a base-deck frame comprising cast aluminum and a base-deck floor comprising stamped stainless steel no more than 2000 μm thick; and an affixing means for affixing the base-deck frame to the base-deck floor, wherein the base-deck frame is operable to mate with both the base-deck floor and the top cover to provide a housing for a hard disk drive. In some embodiments, the affixing means comprises a gasket and a fastener. In some embodiments, the affixing means comprises an epoxy seal or a metal seal. In some embodiments, the base-deck floor is no more than 500 μm thick.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:

a base-deck floor comprising a first metal;

a base-deck frame comprising a second metal different than the first metal, overlying the base-deck floor, *the base-deck frame having sidewalls that extend from an upper surface of the base-deck floor along a perimeter thereof, an inner surface of the base-deck frame and the upper surface of the base-deck floor defining a cavity enclosed laterally by the sidewalls*;

a top cover, overlying the base-deck frame; and an affixing feature operable to affix the base-deck frame to the base-deck floor, wherein the base-deck frame is operable to be fastened to both the base-deck floor and the top cover to provide a housing for a hard disk drive.

2. The apparatus of claim 1, wherein the base-deck frame is operable to be unfastened from [the] both the base-deck floor and the top cover.

3. The apparatus of claim 1, wherein the first metal has a higher elastic modulus than the second metal.

4. The apparatus of claim 3, wherein the first metal comprises stainless steel and the second metal comprises aluminum.

5. The apparatus of claim 1, wherein the base-deck floor comprises stamped stainless steel.

6. The apparatus of claim 5, wherein the base-deck floor has a thickness no more than 2000 μm.

7. The apparatus of claim 6, wherein the thickness provides sufficient stiffness and space in height for hard disk drive internals in a 2.5" or 3.5" form factor.

8. The apparatus of claim 5, wherein the base-deck floor has a thickness no more than 500 μm.

9. The apparatus of claim 1, wherein the affixing feature comprises a gasket and a fastener, an epoxy, or metal seal.

10. The apparatus of claim 1, wherein the affixing feature comprises an isolation seal operable to mechanically isolate forces imparted to the base-deck frame from internals of the hard disk drive that are attached to the base-deck frame.

11. A method, comprising:

assembling at least a portion of a hard disk drive assembly on a stamped base-deck floor;

affixing a cast base-deck frame to the base-deck floor; and securing a top cover to the base-deck frame.

12. The method of claim 11, further comprising:

stamping the top cover;

casting the base-deck frame from aluminum; and stamping the base-deck floor from stainless steel.

13. The method of claim 12, wherein stamping the top cover comprises stamping the top cover from stainless steel.

14. The method of claim 12, wherein the stainless steel has a thickness between 500 and 2000 μm.

15. The method of claim 14, wherein the thickness provides sufficient stiffness and space in height for hard disk drive internals in a 2.5" or 3.5" form factor.

16. The method of claim 11, wherein affixing the base-deck frame to the base-deck floor comprises affixing the base-deck frame to the base-deck floor with a gasket and a fastener, an epoxy, or metal seal.

17. The method of claim 11, wherein affixing the base-deck frame to the base-deck floor comprises welding the base-deck frame to the base-deck floor.

18. An apparatus, comprising:

a top cover, optionally comprising stamped stainless steel;

a base-deck assembly, the base-deck assembly comprising a base-deck frame comprising cast aluminum and a base-deck floor comprising stamped stainless steel no more than 2000 μm thick, *the base-deck frame having sidewalls that extend from an upper surface of the base-deck floor along a perimeter thereof, with an inner surface of the base-deck frame and the upper surface of the base-deck floor defining a cavity enclosed laterally by the sidewalls*; and an affixing means for affixing the base-deck frame to the base-deck floor, wherein the base-deck frame is operable to mate with both the base-deck floor and the top cover to provide a housing for a hard disk drive.

19. The apparatus of claim 18, wherein the affixing means comprises a weld.

20. The apparatus of claim 19, wherein the base-deck floor comprises bracing for greater stiffness.

21. The apparatus of claim 20, wherein the bracing extends radially from an area near or at a point in the base-deck floor coincident with an axis of a spindle motor.

22. The apparatus of claim 18, wherein the apparatus further comprises a 2.5" or 3.5" form factor.

23. The apparatus of claim 18, wherein [a] *the* thickness of the base-deck floor provides sufficient stiffness and space in height for hard disk drive internals.

* * * * *